Sept. 24, 1957            H. C. FINLEY            2,807,116
CORN BORER AND FLYING INSECT TRAP
Filed Oct. 21, 1955                               2 Sheets—Sheet 1
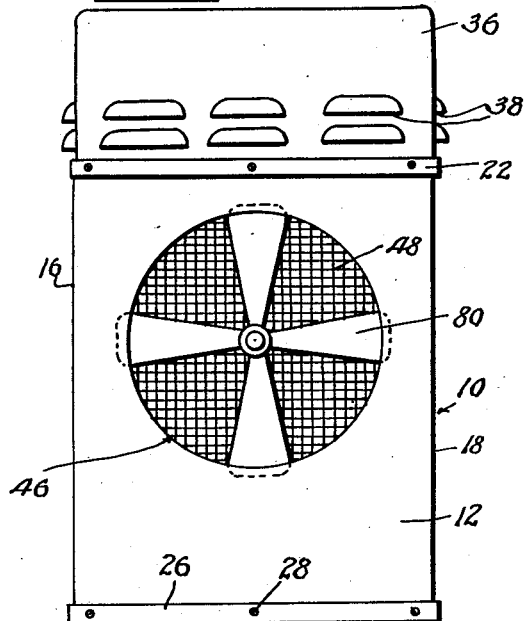
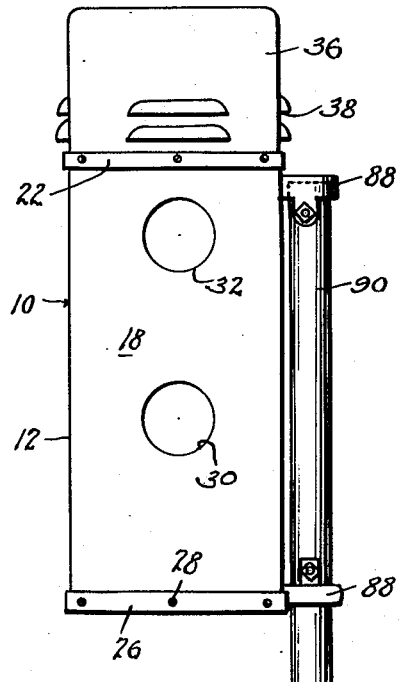 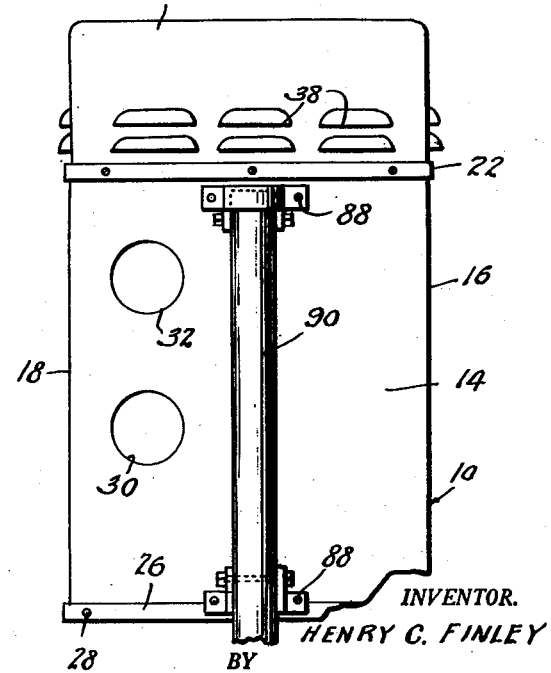
INVENTOR.
HENRY C. FINLEY
BY
Patrick D. Beaver
ATTORNEY.

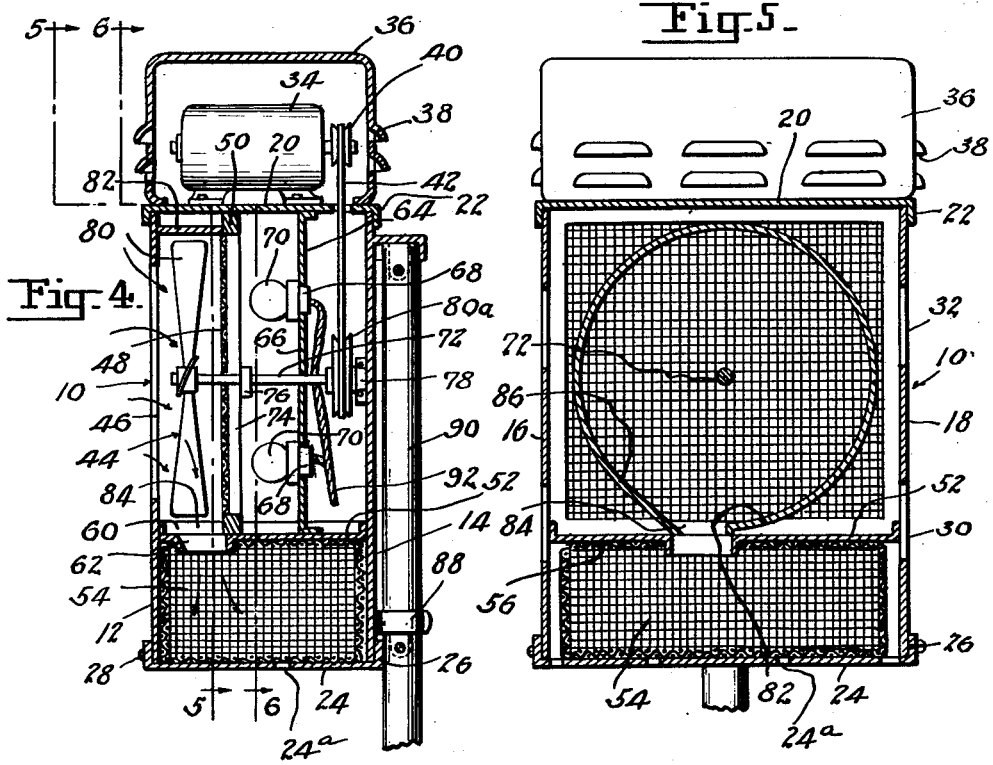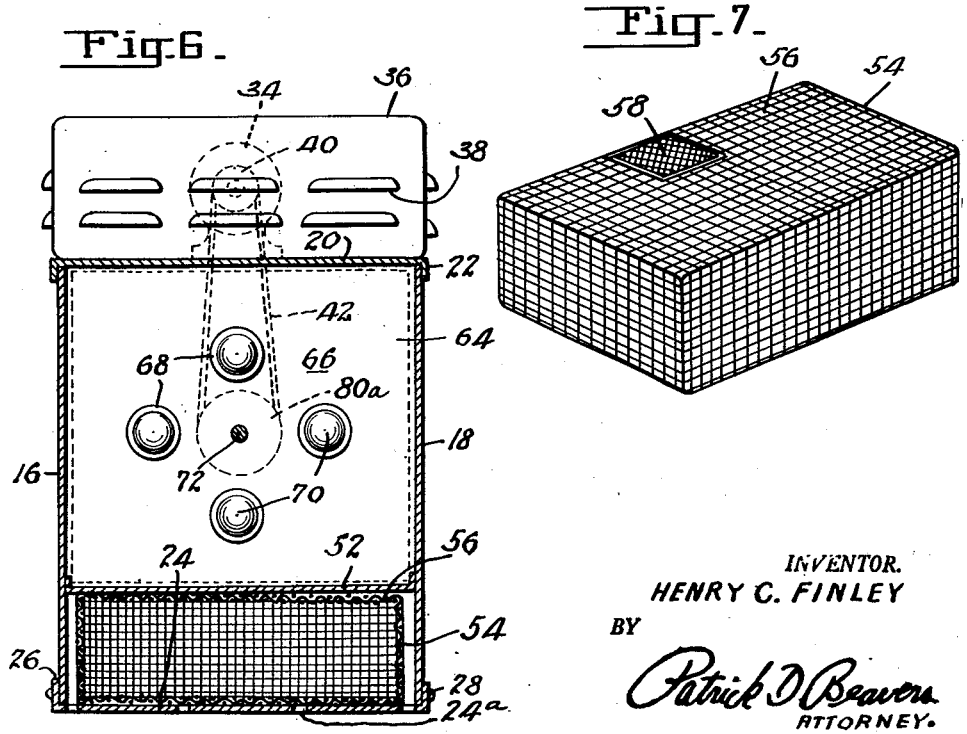

United States Patent Office 2,807,116
Patented Sept. 24, 1957

2,807,116

CORN BORER AND FLYING INSECT TRAP

Henry C. Finley, Fairmount, Ill., assignor to Arthur Finley, Fairmount, Ill.

Application October 21, 1955, Serial No. 542,059

3 Claims. (Cl. 43—139)

This invention appertains to improvements in insect traps and is particularly directed to a novel trap for trapping flying bugs, such as the corn borer in the flying stage, moths and other flying insects.

A primary object of this invention is to provide a trap, which is provided with means for attracting flying insects to an inlet opening in the trap and which is provided with fan means for creating an intake suction at the inlet opening, so as to suck the insects into the housing of the trap.

A further object of this invention is to provide means for attracting flying insects to the housing of the trap and for creating an air current, which will insure that the insects attracted to the opening will be sucked into the housing and discharged into a cage in the housing.

Another important object of this invention is to provide a compact and simple housing, which is provided with a wall having an inlet opening and a fan disposed rearwardly of the inlet opening and creating a suction at the opening, the fan being of the axial intake and peripheral discharge type and discharging the bugs into a cage, disposed below the fan, from where the bugs are unable to escape.

A further object of this invention is to provide a transparent partition behind the fan blades, the partition being of glass or of mesh screen and being provided to block the passage of bugs rearwardly of the fan and yet expose a plate, which is disposed behind the partition and which has a front space that is suitably covered so as to attract the bugs, the front space being painted white or being covered with an aluminum cover or the like means and having illumination means mounted thereon.

Another important object of this invention is to provide a trap, which is particularly designed and is particularly effective for trapping night flying bugs, which are attracted by or to a light surface after darkness.

A further object of this invention is to provide a compact, easily operated and inexpensive trap, which can be easily set up and operated, despite adverse wind conditions or the like climatic conditions.

The foregoing and ancillary objects are attained by this invention, the preferred embodiment of which is set forth in the following description and illustrated in the accompanying drawings, wherein:

Figure 1 is a front elevational view of a trap, constructed in accordance with the principles of this invention;

Figure 2 is a side elevational view thereof;

Figure 3 is a rear elevational view thereof;

Figure 4 is a transverse, vertical sectional view of the trap, illustrating the fan unit and the bug attracting plate and illumination means;

Figure 5 is a vertical sectional view taken on line 5—5 of Figure 4;

Figure 6 is a vertical sectional view taken on line 6—6 of Figure 4;

Figure 7 is a view in perspective of the screen cage, in which the bugs are discharged by the fan.

Referring now more particularly to the accompanying drawings, the trap, generally designated by the numeral 10, includes a front wall 12 and an opposing rear wall 14, which are connected by opposing side walls 16 and 18. A top wall 20 is provided and has a depending marginal flange 22, which overlies the upper edges of the front, rear and sidewalls and may be suitably fastened thereto. A bottom wall 24 is also provided with an upstanding marginal flange 26, which overlies the lower edges of the walls and is secured thereto by screw fasteners 28, so that the bottom wall may be easily detached from the housing, for a purpose to be described.

The opposite sidewalls 16, 18 are formed with openings 30 and 32 which will permit access to the interior of the structure to permit repairs, replacements and lubricating and it is desirable that these openings be provided with some form of movable covering.

The top wall 20 provides a supporting base for a motor 34, which is housed by a casing 36 that is suitably attached to the top wall 20 and is provided with louvre openings 38, that serve as ventilation means for the motor 34.

The motor 34 has its armature shaft provided with a pulley 40, to which a belt 42 is attached for actuating the fan unit 44.

The front wall 12 is provided with an enlarged annular opening 46, which defines an inlet opening for the flying insects. Rearwardly of the opening 46 a screen partition or baffle member 48 is vertically disposed in the housing by means of a framework 50. The screen 48 is positioned rearwardly of the front wall and disposed in confronting relation to the opening 46 and extends completely between the opposing side walls and a partition 52, which is horizontally disposed in the housing and positioned above the bottom wall 24. The screen 48 prevents the insects from gaining access to the interior of the housing and serves as a baffle, while still preventing the air current to pass therethrough and out through the openings in the side walls and rear wall. If desired, especially where it is found that small bugs can clog the screen, a transparent non-porous baffle member may be provided, such as a sheet of glass.

The partition 52 is horizontally disposed in the housing and extends between the front and rear walls and opposing side walls thereof and cooperates with the bottom wall in forming an inclosure for a cage 54, which is shown in detail in Figure 7. The cage 54 is preferably formed from meshed screen or the like porous material and is rectangular in shape, complemental to the cross sectional shape of the housing. The cage has a top wall 56 which is formed with an inlet aperture 58, whereby the insects gain entrance into the cage. The cage is seated on the bottom wall 24 and may be removed, for cleaning purposes and the like, by removing the bottom wall 24, and is so positioned on the bottom wall that the openings or inlet apertures 58 are disposed adjacent the front wall 12 of the housing. The partition, in this respect, is provided with an opening 60, adjacent its front edge, and the opening 60 is formed with a depending funnel 62, which is disposed within the aperture 58, as shown in Figure 5. It will be noted that the partition 52 is so disposed in the housing that a portion of the lower air outlet opening 30 extends below the partition, so that the air currents may pass through the porous walls of the cage and out through the outlet 30.

A plate 64 is vertically mounted in the housing, rearwardly of the screen 48, and is formed with a front space 66, which is disposed through the opening 46. The front space 66 is painted with white paint or covered with aluminum foil or otherwise suitably covered or treated so as to be made attractable to the insects and serve as the "bait means." The plate 64 is provided with a plurality of light bulb sockets 68, which extend through the plate and are disposed on the outer face thereof so that bulbs 70 may be screwed therein and disposed around the front space 66 of the plate.

A fan shaft 72 is supported by a vertical support 74 through a bearing 76 and extends through the plate 64 and the screen 48 and has its rear end further supported by a bearing bracket 78. A pulley 80a is fixedly circumposed on the shaft and has the belt 42 entrained thereon for rotating the shaft 72, which has its outer end disposed in front of the screen and rearwardly of the opening 46.

A fan blade 80 is fixedly circumposed on the extending forward end of the shaft and is positioned between the front wall 12 and the screen 48. The blades of the fan are so pitched that the fan creates an axial intake at the opening and has a peripheral discharge, thereby creating an in-take suction at the opening to draw in the flying insects that clutter around the opening 46 and discharging them peripherally or toward the opening 58 in the cage 54. The fan blades are surrounded by a shroud 82, which is formed with a radial opening 84 that is aligned with the opening 60 in the partition 52. A section 86 of the shroud, immediately leading to the opening 84 is formed tangentially so as to insure that the forward passage of the insects by the fan into and through the aligned openings 84 and 60 and into the cage. The peripheral air stream set up by the fan blades prevents the insects from escaping through the openings and confines them to the cage.

The rear wall 14 of the housing is provided with bracket means 88, whereby the housing may be firstly mounted on a vertical standard or post 90, as shown in Figure 3.

In operation, the bulbs 70 are illuminated through leads 92, from any suitable source, and the motor 34 is energized so as to rotate the fan blades. The flying insects are attracted to the opening 46 by the illuminated front space 66 of the plate and are then sucked in by the air stream, created by the fan blades, and driven around the shroud 82 by the exhaust air streams of the fan blades and forced by the tangential section 86 into the opening 84 and through openings 84 and 60 to the cage. The air streams of the fan blades pass through the porous walls of the cage and the outlet 30 in the side walls of the housing and also pass through the other outlet openings in the housing, so as to not interfere with the proper and complete operation of the fan.

It is desirable that the bottom of the structure be formed with openings 24a which will serve as exhaust ports. It is desirable to place these in the bottom of the structure instead of the sidewall, so that any high winds will serve rather to suck the air through these exhaust ports rather than to restrict or prevent its escape, which would prevail should these exhaust ports be in the sides of the shell.

While the preferred form of this invention has been shown in the drawings and described herein, it is to be understood that other forms and other environments may be realized, as coming within the scope of the invention, defined by the appended claims.

I claim:

1. A trap for trapping bugs attracted by light comprising a housing having opposing front and rear walls and opposing side walls and a top and bottom wall, said front wall having an inlet opening for bugs, a horizontal partition disposed between the front, rear and side walls and spaced above the bottom wall, a cage detachably mounted on the bottom wall below the partition, said cage having a top wall formed with an inlet aperture, said partition having an opening adjacent its front end and aligned with the inlet aperture, a baffle screen vertically disposed in the housing and extending completely between the side walls and top wall and the partition and spaced rearwardly from the front wall and disposed behind the opening in the partition, a shaft horizontally disposed in the housing and extending between the front and rear walls and disposed through the screen, a ventilated casing mounted on the top wall, a motor housed in the casing, drive means extending from the motor through the top wall and connected to the shaft, a fan blade secured on the shaft and disposed behind the opening in the front wall and in front of the screen and creating an intake suction at the inlet opening, means surrounding said blade for conveying the bugs sucked in by the fan blade into the cage through the partition opening, and a plate disposed vertically behind the screen and having a front face covered with a bug attracting cover and illumination means mounted on the face.

2. A trap as claimed in claim 1, wherein said illumination means includes a plurality of light bulb sockets mounted in the plate and exposed on the front face thereof to receive light bulbs.

3. A trap as claimed in claim 1, wherein said means surrounding the fan blade includes an annular shroud having a radial opening aligned with the opening in the partition and a section of said shroud leading to the opening in the direction of rotation of the blade being tangential to divert the bugs into the opening.

References Cited in the file of this patent

UNITED STATES PATENTS 2,608,022    Wright _____ Aug. 26, 1952

FOREIGN PATENTS 762,049    France _____ Jan. 18, 1934